UNITED STATES PATENT OFFICE.

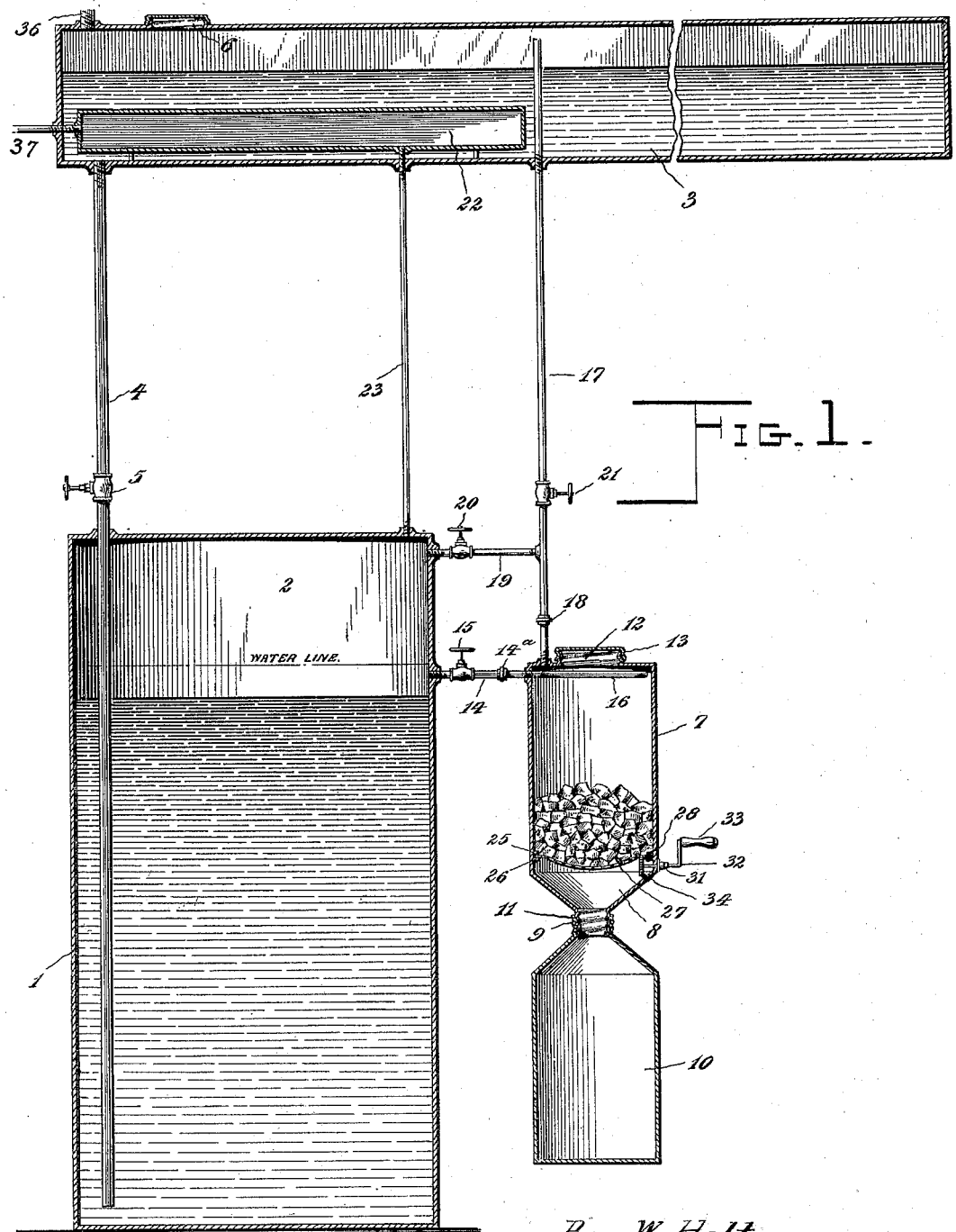

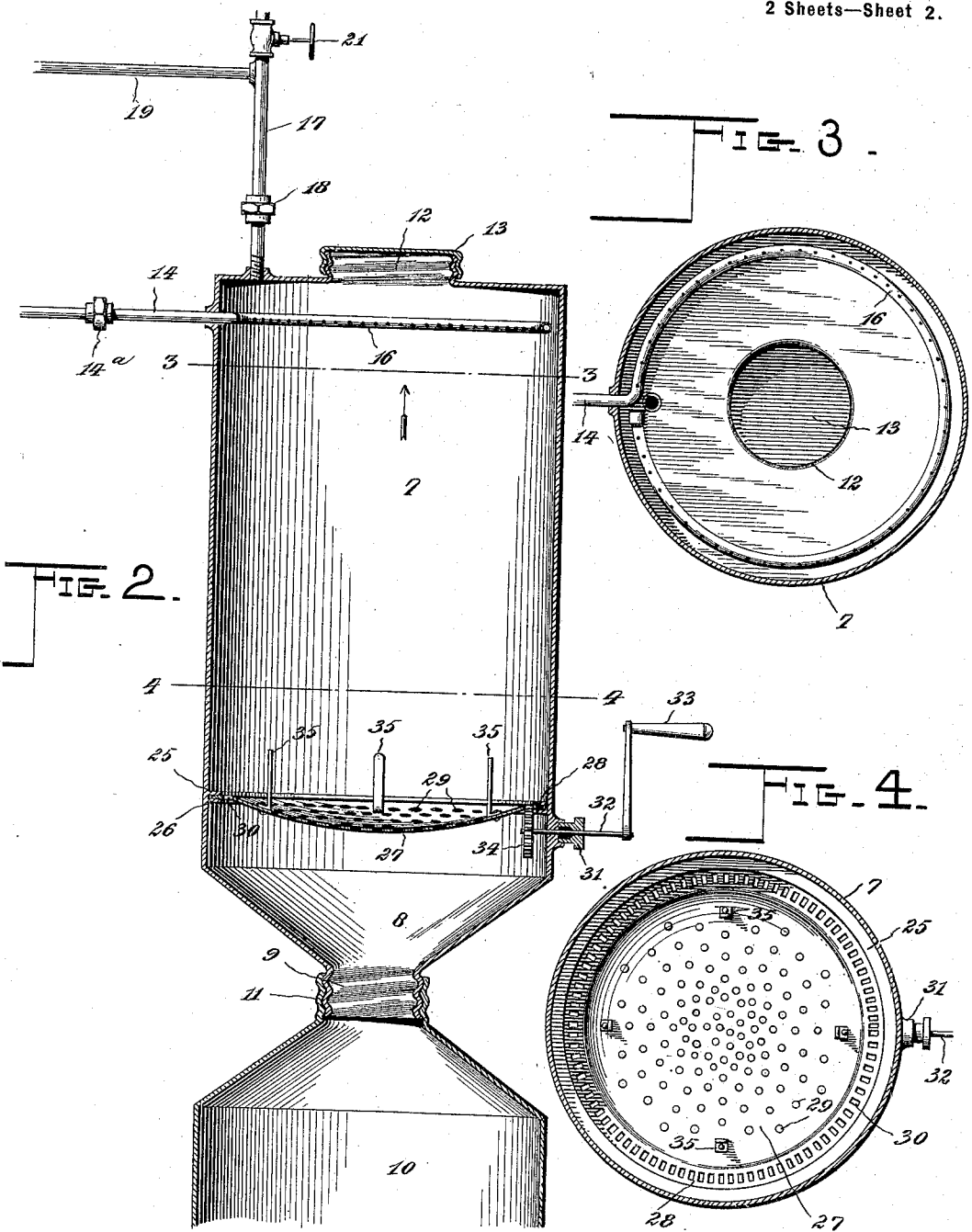

RAY W. HOLT AND HOWARD A. ROSE, OF SYRACUSE, NEBRASKA, ASSIGNORS OF ONE-THIRD TO FRANK A. HOLT, OF OMAHA, NEBRASKA.

ACETYLENE-GAS GENERATOR.

SPECIFICATION forming part of Letters Patent No. 638,459, dated December 5, 1899.

Application filed March 11, 1898. Serial No. 673,509. (No model.)

*To all whom it may concern:*

Be it known that we, RAY W. HOLT and HOWARD A. ROSE, citizens of the United States, residing at Syracuse, in the county of Otoe and State of Nebraska, have invented a new and useful Acetylene-Gas Generator, of which the following is a specification.

Our invention relates to improvements in generators for the production of the gas known to the art as "acetylene" gas, in the operation of producing which a solid, such as calcium carbid, is to be attacked by water to attain chemical reaction between and decomposition of said carbid and water for the generation of the gas.

One of the objects we have in view is to automatically control the generation of the gas in proportion to the demands of the service by bringing the attacking liquid to the carbid on a reduction of the gas volume and pressure, and when sufficient gas has been generated to restore the desired pressure the supply of water to the carbid is automatically cut off, thus arresting the generation until a subsequent reduction of the pressure, owing to consumption, renders it necessary to renew the generation of gas.

A further object is to provide means for cooling and condensing the gas to keep it in a dry cool condition previous to supplying the same to the burners for consumption.

A further object of the invention is to provide an improved construction of the generator in which provision is made for the discharge of the spent or exhausted carbid to a separate refuse-receptacle by means which may be operated externally and which overcomes the necessity for opening the generator to precipitate the refuse, and such generator is readily separable from the gas-receiver for the purpose of repairing or cleaning the generator at any time.

A further object of the invention is to simplify the construction with a view to making the plant exceedingly compact and to reduce the floor area as much as possible, to render the apparatus wholly automatic in action in so far as the generation of the gas in proportion to the volume and pressure of the supply thereof is concerned, and to dispense with automatic cut-offs by employing a moving column of liquid to attack the carbid.

With these ends in view the invention consists in the novel combination of elements and in the construction and arrangement of parts, which will be hereinafter fully described and claimed.

To enable others to understand our invention, we have illustrated the preferred embodiment thereof in the accompanying drawings, forming a part of this specification, and in which—

Figure 1 is a vertical central sectional elevation of our acetylene-gas-generating apparatus. Fig. 2 is an enlarged sectional elevation through the generator and its pipe connections, the gas-receiver and water-supply tanks being omitted. Fig. 3 is a horizontal sectional plan view on the plane indicated by the dotted line 3 3 of Fig. 2. Fig. 4 is a like plan view through the generator on the plane indicated by the dotted line 4 4 of Fig. 2.

Like numerals of reference denote like and corresponding parts in each of the several figures of the drawings.

In carrying our invention into practice we employ a stationay main tank 1, which serves as a reservoir for the water to be supplied to the generator and as a reserve storage-chamber for the gas. This stationary tank 1 is filled with water up to a suitable level, but the water does not entirely fill the tank, thus leaving a chamber 2 at the upper part of the tank in which the reserve supply of gas is to be stored. In connection with the tank 1 we provide a water-chamber 3, which is operatively connected with the water-space of the tank 1 by means of a pipe 4, so that the pressure of the water in the chamber 3 is communicated to the water in the tank 1. This upper water-chamber 3 is arranged in a horizontal position over the apparatus, and its capacity is equal to that of the tank 1, so that water displaced by gas-pressure within the tank 1 is free to ascend in the pipe 4 and accumulate in the elevated chamber 3. Said elevated pressure-chamber 3 is a closed chamber, and it is provided with a filling-nozzle 6, adapted to be securely closed by a threaded head or closure, which may be conveniently removed when it is desired to renew the water-supply in the apparatus.

The generator is situated exteriorly to the tank, and it consists of a vertical shell 7, preferably cylindrical in form and arranged with its upper end substantially on the water-level in the tank 1. This generator-shell is provided with a conical bottom 8, the lower extremity of which terminates in a threaded nipple 9. In vertical alinement with the generator-shell is a refuse-receptacle 10, which is situated below the generator and is detachably connected thereto by means of a coupling 11, which is fitted to the neck of the refuse-receptacle and is screwed upon or into the threaded nipple 9. This refuse-receptacle is in communication with the generator-shell through the described connections between said shell and the receptacle, and said coupling thus serves to detachably connect the receptacle to the shell for the purpose of readily removing the refuse-receptacle and emptying the spent or exhausted carbid which accumulates therein.

The generator-shell is closed at its upper end by a suitable head, in which is provided a filling-nozzle 12, securely closed by a cap 13, which may be removed to permit access to be obtained to the generator for placing a fresh charge of carbid therein.

The generator and tank 1 are connected together by a water-pipe 14, which is made in two sections, one of which is permanently united or fastened to the tank 1 at or near the water-line therein, while the other section of said water-pipe is attached to and extends inwardly into the upper part of the generator-shell 17. These sections of the water-pipe 14 are detachably united together by a union or coupling 14ª, and the section of pipe 14 attached to the tank 1 has a suitable cut-off or valve 15, which may be closed by hand when it is desired to detach the generator from the tank. Within the upper part of the generator-shell is arranged a sprayer 16, which is preferably in the form of a curved or irregularly-shaped pipe occupying a horizontal position over the charge of carbid within the generator, and one end of this sprayer-pipe is suitably attached to the section of the water-pipe 14 which is fastened to the generator-shell. Said sprayer-pipe is, furthermore, provided with two series of perforations, one series of which are on the inner face of the sprayer-pipe, while the other series are in the lower face of said sprayer-pipe; but we do not strictly confine ourselves to the described arrangement of perforations, as any sprayer which will deliver the water in thin streams over the carbid falls within the scope of our invention.

The gas generated within the generator-shell is conveyed therefrom by a vertical gas-pipe 17, which extends upwardly from the generator through the bottom of the elevated water-pressure chamber 3 and terminates below the upper wall of said chamber 3. This vertical gas-pipe is in two parts—a long upper section and a short lower section, and said short lower section is rigidly united to the head of the generator-shell, the two sections of said pipe 17 being detachably connected together by a coupling or union 18 of any preferred construction.

In the lower part of the elevated water-pressure chamber 3 we provide a condensing and cooling chamber 22, which is sustained within said chamber 3 above the bottom thereof in any suitable way, so as to have the walls of the chamber 22 exposed to the cooling action of the water in the chamber 3. This cooling and condensing chamber is connected with the upper gas-chamber 2 of the tank 1 by a vertical gas-conveying pipe 23, the lower end of which is suitably attached to the head of the tank 1, and its upper end is carried through the bottom of the elevated chamber 3 and attached to the bottom of the cooling-chamber 22 to communicate with the interior of said chamber.

The gas from the generator admitted to the vertical pipe 17 is conducted into the upper gas-chamber 2 of the tank by a branch pipe 19, arranged in a horizontal position between the tank 1 and the pipe 17, said branch gas-pipe lying above and parallel to the water-pipe 14. One end of the branch pipe is rigidly attached to the shell of the tank 1 to communicate with the gas-chamber 2 therein, and the other end of said pipe 19 is attached to the long upper length of the vertical gas-pipe 17. This pipe 17 is provided with a cut-off or valve 21 at a point above the connection of the branch pipe 19 to the pipe 17, and said branch pipe is also provided with a valve 20 at a point between its attachment to the tank 1 and the pipe 17. The valve 21 in the gas-pipe 17 is normally closed; but the valves 15 and 20 in the water-pipe 14 and branch pipe 19 are normally open to permit water under a reduction of gas-pressure to pass from the tank 1 to the generator and to insure the uninterrupted flow of gas from the generator to the lower part of the pipe 17 and the branch pipe 19 to the chamber 2 of the tank, and thence through the pipe 23 to the cooling and condensing chamber 22. By having the pipes 14 17 made in sections and employing the valves 15 and 21 in said pipes the valves may be closed to cut off communication between the generator and the tank 1, and the unions or couplings 14ª and 18 may be operated to remove the generator from the tank and the system of pipes, thus permitting inspection and cleaning of the generator without the escape and waste of gas from the chambers 2 and 22. Previous to recharging the generator with fresh carbid the valves 15 and 20 in the pipes 14 and 19 should be closed, after which the valve 21 in the pipe 17 may be opened to permit the gas to pass from the generator into the closed upper chamber 3, from whence the gas is permitted to escape through a vent-pipe 36, which is attached to the upper part of the elevated water-chamber 3, thereby preventing the escape of gas into the dwelling or building in which the plant may be installed, because said pipe 36 may lead to the outside of the building.

In our invention we employ a novel construction of the generator adapted to permit the spent or exhausted carbid therein to be precipitated or discharged into the refuse-receptacle 10, and to this end we provide means by which the carbid may be agitated so as to insure the precipitation of the spent matters or refuse in the generator into the conical bottom 8 and thence through the receptacle 10. In this part of our invention we provide on the interior of the generator-shell the two series of flanges or lugs 25·26, which are disposed in the same vertical plane and lie in different horizontal planes. In lieu of the series of lugs we may employ continuous flanges spaced apart and arranged parallel to each other. These lugs or flanges receive and support a revoluble grate 27, which serves to support the charge of carbid in the generator, and this grate is perforated for the passage therethrough of the carbid refuse. In the preferred embodiment of the invention the bottom or grate 27 is of concavo-convex cross-sectional contour and provided at its periphery with a horizontal flange 28, that extends beyond the dished and perforated part of the grate or bottom and fits between the flanges or lugs 25 26. This offstanding horizontal flange 28 serves to revolubly support the grate or bottom within the generator-shell because it rests upon the lugs or flanges 26, and the parallel flanges or lugs hold the grate or bottom against vertical displacement in either direction within the generator-shell. The dished part within the horizontal supporting-flange of the grate or bottom is perforated with a multiplicity of circular apertures 29, and said flange 28 of the bottom or grate is provided with a circular series of transverse angular slots 30.

It is evident that one of the grate-supporting flanges may be fastened removably to the shell of the generator to permit the introduction or removal of the shaking grate.

In the generator-shell 7, below the lower flange or lug 26 therein is rigidly secured a stuffing-box 31, and through this stuffing-box passes a horizontal short shaft 32, the outer end of which carries a suitable operating-crank 33, by which the shaft may be conveniently turned by hand. To the inner end of the short shaft is rigidly secured a spur-pinion 34, the teeth of which fit into the angular slots 30 of the grate or bottom 27, thus operatively connecting the shaft and grate to insure shaking or oscillating motion to the latter when the hand-crank is manipulated. This grate or bottom 27 is, furthermore, provided with a series or stirrers 35, which consist of suitable pins or fingers that are rigidly attached to the grate 27 in a suitable way and extend upwardly into the carbid-chamber of the generator-shell 7. The described construction permits the operator to agitate the grate or bottom of the generator by operating the hand-crank 33 on the shaft 32, which is geared to said grate 27, and the stirrer-fingers 35 extend upwardly into the body or charge of carbid to agitate the same and cause the loose or spent carbid to become precipitated through the perforated grate and to accumulate in the refuse-receptacle 10.

The operation may be described as follows: The charge of carbid is placed in the shell 7 of the generator, the valves being closed. The valve 5 having been closed in the water-pipe 4, the water is introduced into the elevated water-chamber 3 through the filling-nozzle 6 thereof, after which the nozzle is closed. The operator now opens the valve 5 in the pipe 4, the valve 15 in the pipe 14, and the valve 20 in the pipe 19, the valve 21 in the pipe 17 being closed. The water descending through the pipe 4 rises in the tank 1 above the orifice of the pipe 14, and the water thus flows from the tank to the sprayer 16, from whence it is discharged in thin streams upon the charge of carbid within the generator. The water attacks the carbid, resulting in decomposition of the water and carbid and the production of acetylene gas, which passes from the generator through the lower part of the pipe 17 and the pipe 19 into the chamber 2 of the tank and thence through the pipe 23 into the cooling-chamber 22, an off bearing pipe 37 being connected to said cooling-chamber 22 and leading from thence to the system of piping in the building or dwelling. The gas having been generated in sufficient quantity to fill the cooling-chamber and the chamber 2 in the tank, the pressure of gas upon the water in the tank 1 depresses or displaces the column of water sufficiently to lower the level below the orifice of the pipe 19, and the passage of water from from the tank 1 to the sprayer in the generator is thus automatically cut off. The water displaced by gas-pressure in the tank ascends in the stand-pipe 4 and is delivered into the chamber 3, and the cooling-chamber 22 is thus immersed in the water, the contact of which with the walls of said chamber serves to keep the latter at a low temperature. The gas as it is supplied to the chamber 22 impinges against the cool walls thereof, and the gas is thus cooled and the watery vapors therein are condensed to flow to the bottom of the chamber 22, from whence they find their exit through the pipe 23 into the tank 1. The gas is cooled and kept in a dry condition by the described construction and arrangement of parts, so that the pipes and burners are not clogged by deposit of sediment in the pipes and burners. The apparatus acts automatically to bring the attacking liquid to the carbid in the generator on a reduction of gas-pressure, owing to consumption of the gas contained within the cooling-chamber. Such a reduction of gas-pressure allows the water to rise in the tank 1 to and above the level of the pipe 14, the water passing through said pipe and the sprayer upon the carbid in the generator, thus renewing the generation of gas proportionately to the water admitted to the generator. The valves may be closed to permit the charge of carbid to be renewed in the generator, and, if desired, the shaft 32 may be operated to agitate the contents of the generator and cause the spent carbid to pass through the grate or bottom and accumulate in the receptacle 10.

We are aware that changes in the form and proportion of parts and in the details of construction may be made by a skilled mechanic without departing from the spirit or sacrificing the advantages of this invention, and we therefore reserve the right to make such modifications as clearly fall within the scope of the invention.

Having thus described the invention, what we claim is—

1. In an acetylene-gas apparatus, the combination with a water-cistern, and an externally-arranged generator having a separable water-pipe connection with said cistern, of a closed elevated water-tank having a water-pipe connection with the cistern and a vent-pipe, a sectional jointed vertical gas-pipe having one member attached to the generator and its other valved member connected to the closed water-tank to discharge thereto above the level of the water therein, a valved horizontal branch pipe connected to the cistern and coupled to the upper member of the vertical gas-pipe at a point above the joint between the two members thereof, and a condensing-chamber situated in said tank and connected to a gas-chamber of the cistern, substantially as described.

2. In an acetylene-gas generator, a concavo-convex perforated grate provided with an off-standing annular flange having a continuous series of slots around the perforations in the grate, and a series of upwardly-extending agitators secured to the grate within the perforated flange thereof, in combination with a shell, flanges fixed within the shell to support the grate revolubly in place between a water-inlet and a residue-discharge opening, a stuffing-box on the generator-shell, and a shaft having a gear-pinion which meshes with the slotted flange of the grate, substantially as described.

In testimony that we claim the foregoing as our own we have hereto affixed our signatures in the presence of two witnesses.

RAY W. HOLT.
HOWARD A. ROSE.

Witnesses:
J. G. McFARLAND,
JOS. E. CASE.